(12) United States Patent
Kim et al.

(10) Patent No.: US 11,108,107 B2
(45) Date of Patent: Aug. 31, 2021

(54) SECONDARY BATTERY AND METHOD FOR MANUFACTURING THE SAME, AND POUCH FOR SECONDARY BATTERY AND METHOD FOR MANUFACTURING THE SAME

(71) Applicant: LG Chem, Ltd., Seoul (KR)

(72) Inventors: Na Yoon Kim, Daejeon (KR); Yong Su Choi, Daejeon (KR); Sang Hun Kim, Daejeon (KR); Hyung Kyun Yu, Daejeon (KR); Soo Ji Hwang, Daejeon (KR); Min Hyeong Kang, Daejeon (KR); Yong Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/479,010

(22) PCT Filed: Oct. 19, 2018

(86) PCT No.: PCT/KR2018/012420
§ 371 (c)(1),
(2) Date: Jul. 18, 2019

(87) PCT Pub. No.: WO2019/098545
PCT Pub. Date: May 23, 2019

(65) Prior Publication Data
US 2020/0295315 A1    Sep. 17, 2020

(30) Foreign Application Priority Data

Nov. 15, 2017  (KR) .................. 10-2017-0152476

(51) Int. Cl.
*H01M 2/02* (2006.01)
*H01M 50/124* (2021.01)
*B32B 15/088* (2006.01)
*B32B 15/20* (2006.01)
*B32B 37/18* (2006.01)
*B32B 38/00* (2006.01)
*H01M 10/0525* (2010.01)
*H01M 50/30* (2021.01)
*H01M 50/183* (2021.01)
*H01M 50/531* (2021.01)
*H01M 50/572* (2021.01)

(52) U.S. Cl.
CPC ......... *H01M 50/124* (2021.01); *B32B 15/088* (2013.01); *B32B 15/20* (2013.01); *B32B 37/182* (2013.01); *B32B 38/0004* (2013.01); *H01M 10/0525* (2013.01); *H01M 50/183* (2021.01); *H01M 50/30* (2021.01); *H01M 50/531* (2021.01); *H01M 50/572* (2021.01); *B32B 2307/206* (2013.01); *B32B 2307/30* (2013.01); *B32B 2311/24* (2013.01); *B32B 2377/00* (2013.01); *B32B 2457/10* (2013.01)

(58) Field of Classification Search
CPC ........ H01M 2/0287; H01M 2/08; H01M 2/12; H01M 2/34; H01M 50/124; H01M 50/30; H01M 50/531; H01M 50/572; H01M 50/183; B32B 15/088; B32B 15/20; B32B 15/182
See application file for complete search history.

(56) References Cited

U.S. PATENT DOCUMENTS

| | | | |
|---|---|---|---|
| 6,677,075 B2 * | 1/2004 | Cramer | H01M 2/368 429/89 |
| 7,976,981 B2 * | 7/2011 | Lee | H01M 2/361 429/176 |
| 9,722,274 B2 * | 8/2017 | Akutsu | H01M 2/365 |
| 2006/0216591 A1 | 9/2006 | Lee | |
| 2013/0244093 A1 | 9/2013 | Min et al. | |
| 2014/0141299 A1 * | 5/2014 | Yoshino | H01M 2/1241 429/82 |
| 2015/0072185 A1 * | 3/2015 | Cho | H01M 2/06 429/56 |
| 2016/0308181 A1 | 10/2016 | Kato et al. | |
| 2019/0386330 A1 * | 12/2019 | Choi | H01M 10/058 |
| 2020/0259146 A1 * | 8/2020 | Kim | H01M 2/021 |
| 2020/0282627 A1 * | 9/2020 | Kim | B29C 51/262 |

FOREIGN PATENT DOCUMENTS

| | | | |
|---|---|---|---|
| EP | 3082189 A1 | 10/2016 | |
| KR | 10-2006-0103692 A | 10/2006 | |
| KR | 10-2006-0103696 A | 10/2006 | |
| KR | 101159099 B1 | 6/2012 | |
| KR | 10-2014-0017908 A | 2/2014 | |
| KR | 10-2014-0030431 A | 3/2014 | |
| KR | 10-2014-0036437 A | 3/2014 | |
| KR | 20150113660 A | 10/2015 | |
| KR | 20170058047 A | 5/2017 | |

OTHER PUBLICATIONS

English translation of the written opinion(no date).*
Extended European Search Report including Written Opinion for Application No. EP18879729.4 dated Jun. 19, 2020, 9 pgs.

* cited by examiner

*Primary Examiner* — Amanda C. Walke
(74) *Attorney, Agent, or Firm* — Lerner, David, Littenberg, Krumholz & Mentlik, LLP

(57) ABSTRACT

To solve the above problems, a pouch for a battery according to an embodiment of the present invention includes: a cup part that accommodates an electrode assembly and is formed by laminating a surface protection layer, a gas barrier layer including a metal, and a sealant layer; and a degassing part in which a degassing aperture is punched when a degassing process is performed and in which no gas barrier layer is formed.

20 Claims, 16 Drawing Sheets

SECONDARY BATTERY AND METHOD FOR MANUFACTURING THE SAME, AND POUCH FOR SECONDARY BATTERY AND METHOD FOR MANUFACTURING THE SAME

CROSS-REFERENCES TO RELATED APPLICATIONS

This application is a U.S. national phase application, pursuant to 35 U.S.C. § 371, of PCT/KR2018/012420, filed Oct. 19, 2018, designating the United States, which claims priority to Korean Application No. 10-2017-0152476, filed Nov. 15, 2017. The entire contents of the aforementioned patent applications are incorporated herein by this reference.

TECHNICAL FIELD

The present invention relates to a secondary battery and a method for manufacturing the same, and a pouch for the secondary battery and a method for manufacturing the same, and more particularly, to a secondary battery and a method for manufacturing the same, and a pouch for the secondary battery and a method for manufacturing the same, to secure economical efficiency by decreasing manufacturing costs and increasing production, and to punch a degassing aperture more easily.

BACKGROUND ART

Batteries (cells), which generate electric energy through physical or chemical reactions to supply the generated electric energy to the outside, are used when AC power supply to the building is not obtained, or DC power is required due to the living environments surrounded by various electronic devices.

Among such batteries, primary batteries and secondary batteries, which are chemical cells using chemical reactions, are generally used. The primary batteries are consumable cells which are collectively referred to as dry cells. On the other hand, a secondary battery is a rechargeable battery that is manufactured using a material in which oxidation and reduction processes between current and a material are capable of being repeated multiple times. In other words, when the reduction reaction to the material is performed by the current, power is charged. When the oxidation reaction to the material is performed by the current, power is discharged. Such charging-discharging are repeatedly performed to generate electricity.

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

A lithium secondary battery is generally formed by laminating a positive electrode (i.e., cathode), a separator, and a negative electrode (i.e., anode). Materials of the positive electrode, the separator, and the negative electrode may be selected in consideration of battery lifespan, charging/discharging capacities, temperature characteristics, stability, and the like. The charging and discharging of the lithium secondary battery are performed while lithium ions are intercalated and deintercalated from lithium metal oxide of the positive electrode to a graphite electrode of the negative electrode.

In general, unit cells, each of which has a three-layered structure of a positive electrode/a separator/a negative electrode or a five-layered structure of a positive electrode/a separator/a negative electrode/a separator/a positive electrode or a negative electrode/a separator/a positive electrode/a separator/a negative electrode, are assembled to constitute one electrode assembly. The electrode assembly is accommodated in a particular case.

Such a secondary battery is classified into a pouch type secondary battery and a can type secondary battery based on a material of a case that accommodates the electrode assembly. In the pouch type secondary battery, an electrode assembly is accommodated in a pouch made of a flexible polymer material having a variable shape. In the can type secondary battery, an electrode assembly is accommodated in a case made of a metal or plastic material having a predetermined shape.

A pouch that is a case of the pouch type secondary battery is manufactured as an exterior made of a flexible material. Further, the pouch includes a cup part having an accommodation space that accommodates the electrode assembly and a degassing part having a degassing aperture in which a degassing process is performed. The degassing part is cut to be removed when the degassing process is completed. However, in the related art, a gas barrier layer including a metal is laminated on the degassing part. Thus, manufacturing cost of the pouch for the secondary battery may be increased, and production of the secondary battery may be reduced. In addition, there is a problem that significant time and efforts are consumed to punch the degassing aperture in the degassing part.

DISCLOSURE OF THE INVENTION

Technical Problem

An object of the present invention is to provide a secondary battery and a method for manufacturing the same, and a pouch for the secondary battery and a method for manufacturing the same, in which economical efficiency is secured by reducing manufacturing costs and increasing production.

Another object of the present invention is to provide a secondary battery and a method for manufacturing the same, and a pouch for the secondary battery and a method for manufacturing the same, in which a degassing aperture is more easily punched.

The objects of the present invention are not limited to the aforementioned objects, but other objects not described herein will be clearly understood by those skilled in the art from descriptions below.

Technical Solution

To solve the above problems, a method for manufacturing a secondary battery according to an embodiment of the present invention includes steps of: forming a first adhesion surface by applying an adhesive to a portion of both surfaces of a metal plate while the metal plate is transferred; cutting the metal plate; forming a plurality of first lamination plates by respectively laminating a plurality of surface protection plates on the both surfaces of the metal plate; forming a second adhesion surface by applying the adhesive on an entire surface of at least one of the plurality of first lamination plates, on which the metal plate is laminated; forming a second lamination plate by laminating a sealant plate on the second adhesion surface; cutting the second lamination plate to manufacture a pouch including a cup part in which the metal plate exists and a degassing part in which no metal plate exists; accommodating an electrode assembly in an accommodation space formed in the cup part; opening a portion of an edge of the pouch to form an opening and sealing a remaining portion of the edge; injecting an electrolyte through the opening; primarily sealing the opening; punching a degassing aperture in the degassing part; performing a degassing process; and secondarily sealing the degassing part.

In the step of cutting the metal plate, the metal plate may be cut with respect to a boundary of the first adhesion surface.

In the step of forming the first adhesion surface on a portion of the metal plate, the first adhesion surface may be repeatedly and alternately formed on the both surfaces of the metal plate at a predetermined distance.

In the step of forming the first adhesion surface on a portion of the metal plate, the first adhesion surface may be formed on only one surface of the metal plate at a left side and only the other surface of the metal plate at a right side with respect to a central axis formed along a longitudinal direction of the metal plate.

After the step of secondarily sealing the degassing part is performed, the degassing part may be cut and removed.

After the step of secondarily sealing the degassing part is performed, the degassing part may be wound around a side portion of the cup part.

To solve the above problems, a pouch for a battery according to an embodiment of the present invention includes: a cup part that accommodates an electrode assembly and is formed by laminating a surface protection layer, a gas barrier layer including a metal, and a sealant layer; and a degassing part in which a degassing aperture is punched when a degassing process is performed and in which no gas barrier layer is formed.

The metal may include aluminum.
The surface protection layer may be made of a polymer.
The polymer may include nylon.
The sealant layer may be made of a polymer.
The polymer may include polypropylene.
The degassing part may be cut and removed after the degassing process is performed.
The degassing part may be wound around a side portion of the cup part after the degassing process is performed.

The pouch may further include a protection circuit module, which is electrically connected to an electrode tab of the electrode assembly, includes an input/output terminal that performs charging/discharging of the electrode assembly, and controls malfunction.

The pouch may further include: an upper molding part that covers an upper portion of the protection circuit module and exposes the input/output terminal; and a lower molding part that protects a lower portion of the protection circuit module against an external impact.

To solve the above problems, a method for manufacturing a pouch for a secondary battery according to an embodiment of the present invention includes steps of: forming a first adhesion surface by applying an adhesive to a portion of both surfaces of a metal plate while the metal plate is transferred; cutting the metal plate; forming a plurality of first lamination plates by respectively laminating a plurality of surface protection plates on the both surfaces of the metal plate; forming a second adhesion surface by applying the adhesive on an entire surface of at least one of the plurality of first lamination plates, on which the metal plate is laminated; forming a second lamination plate by laminating a sealant plate on the second adhesion surface; and cutting the second lamination plate to form a piece including a cup part in which the metal plate exists and a degassing part in which no metal plate exists.

In the step of cutting the metal plate, the metal plate may be cut with respect to a boundary of the first adhesion surface.

In the step of forming the first adhesion surface on a portion of the metal plate, the first adhesion surface may be repeatedly and alternately formed on the both surfaces of the metal plate at a predetermined distance.

In the step of forming the first adhesion surface on a portion of the metal plate, the first adhesion surface may be formed on only one surface of the metal plate at a left side and only the other surface of the metal plate at a right side with respect to a central axis formed along a longitudinal direction of the metal plate.

To solve the above problems, a secondary battery includes: an electrode assembly formed by winding or laminating a positive electrode to which a positive electrode tab is attached, a negative electrode to which a negative electrode tab is attached, and a separator; a battery case formed by sealing an upper pouch and a lower pouch and including a cup part in which the electrode assembly is accommodated and a degassing part in which a degassing aperture is punched, wherein, after a degassing process is completed, the degassing part is wound around a side portion of the cup part; a protection circuit module electrically connected to the positive electrode tab and the negative electrode tab, including an input/output terminal that performs charging/discharging of the electrode assembly, and controlling malfunction; an upper molding part that covers an upper portion of the protection circuit module and exposes the input/output terminal; and a lower molding part that protects a lower portion of the protection circuit module against an external impact, wherein the cup part is formed by laminating a surface protection layer, a gas barrier layer including a metal, and a sealant layer, and no gas barrier layer is formed in the degassing part.

The metal may include aluminum.
The surface protection layer may be made of a polymer.
The polymer may include nylon.
The sealant layer may be made of a polymer.
The polymer may include polypropylene.
Particularities of other embodiments are included in the detailed description and drawings.

Advantageous Effects

The embodiments of the present invention may have at least the following effects.

The gas barrier layer including the metal may be removed from the degassing part to reduce manufacturing costs of the pouch for the secondary battery and increase production of the secondary battery, thereby securing the economical efficiency.

Further, since the gas barrier layer is removed from the degassing part, the degassing part may become thinner, and since punching the gas barrier layer is unnecessary, the degassing aperture may be more easily punched in the degassing part.

The effects of the present invention are not limited by the aforementioned description, and thus, more varied effects are involved in this specification.

MODE FOR CARRYING OUT THE INVENTION

Figure 1:
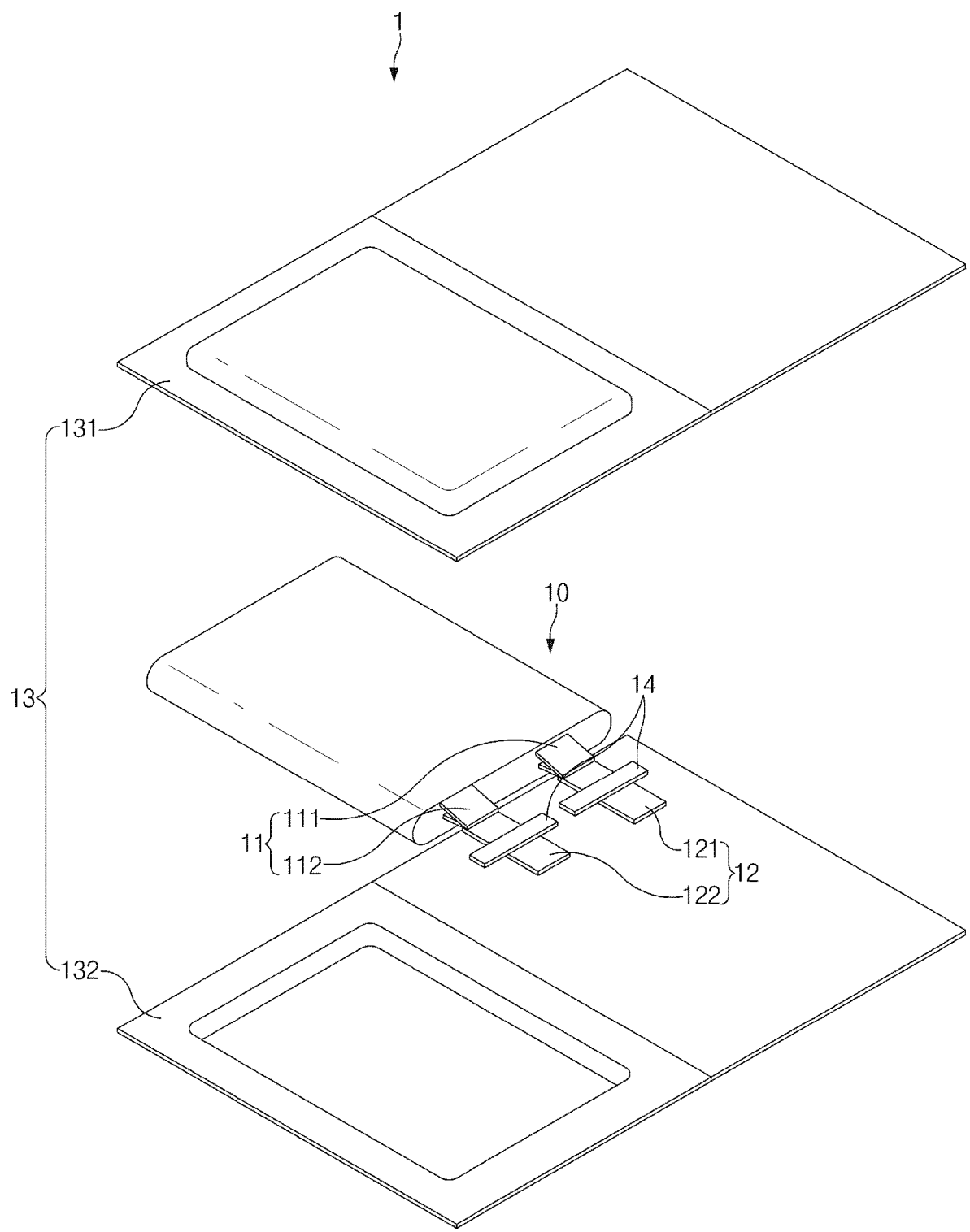
FIG. 1 is an assembled view of a pouch type secondary battery according to an embodiment of the present invention.

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the inventive concept. In this specification, the terms of a singular form may comprise plural forms unless specifically mentioned. The meaning of 'comprises' and/or 'comprising' does not exclude other components besides a mentioned component.

Hereinafter, preferred embodiments will be described in detail with reference to the accompanying drawings.

FIG. 1 is an assembled view of a pouch type secondary battery 1 according to an embodiment of the present invention.

In general, in a process of manufacturing a lithium secondary battery, first, slurry in which an electrode active material, a binder, and a plasticizer are mixed with each other is applied to a positive electrode current collector and a negative electrode current collector to manufacture a positive electrode plate and a negative electrode plate. Thereafter, the negative electrode plate and the positive electrode plate are respectively laminated on both sides of a separator to form an electrode assembly 10 having a predetermined shape, and subsequently, the electrode assembly is inserted into a battery case 13, an electrolyte is injected, and a sealing process is performed.

As illustrated in FIG. 1, the electrode assembly 10 includes an electrode tab 11. The electrode tab 11 is connected to each of a positive electrode and a negative electrode of the electrode assembly 10 to protrude to the outside of the electrode assembly 10, thereby providing a path, through which electrons move, between the inside and outside of the electrode assembly 10. A collecting plate of the electrode assembly 10 is constituted by a portion coated with an electrode active material and a distal end, on which the electrode active material is not applied, i.e., a non-coating portion. Further, the electrode tab 111 may be formed by cutting the non-coating portion or by connecting a separate conductive member to the non-coating portion by ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 by spot welding. A portion of the electrode lead 12 is surrounded by an insulation part 14. The insulation part 14 may be disposed to be limited within a sealing part, at which an upper pouch 131 and a lower pouch 132 are thermally fused, to allow the electrode lead 12 to be bonded to the battery case 13. Also, electricity generated from the electrode assembly 10 may be prevented from flowing to the battery case 13 through the electrode lead 12, and the sealing of the battery case 13 may be maintained. Thus, the insulation part 14 may be made of a nonconductor having non-conductivity, which is not electrically conductive. In general, although an insulation tape which is easily attached to the electrode lead 12 and has a relatively small thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. In particular, the positive electrode lead 121 may be made of the same material as the positive electrode plate, i.e., an aluminum (Al) material, and the negative electrode lead 122 may be made of the same material as the negative electrode plate, i.e., a copper (Cu) material or a copper material coated with nickel (Ni). A portion of the electrode lead 12, which protrudes to the outside of the battery case 13, may be provided as a terminal part and electrically connected to an external terminal.

In the pouch type secondary battery 1 according to an embodiment of the present invention, the battery case 13 may be a pouch made of a flexible material. Hereinafter, the case in which the battery case 13 is the pouch will be described. The battery case 13 accommodates the electrode assembly 10 to allow a portion of the electrode lead 12, i.e., the terminal part to be exposed and then sealed. As illustrated in FIG. 1, the battery case 13 includes the upper pouch 131 and the lower pouch 132. An accommodation space in which the electrode assembly 10 is accommodated may be provided in the lower pouch 132, and upper pouch 131 may be disposed on the space to cover the space to prevent the electrode assembly 10 from being separated to the outside of the battery case 13. As illustrated in FIG. 1, the upper pouch 131 and the lower pouch 132 may be separately provided, but the present invention is not limited thereto. The upper pouch 131 and the lower pouch 132 may be manufactured through various manners, for example, one side of the upper pouch 131 and one side of the lower pouch 132 may be connected to each other.

When the electrode lead 12 is connected to the electrode tab 11 of the electrode assembly 10, and the insulation part 14 is provided on a portion of the electrode lead 12, the electrode assembly 10 may be accommodated in the accommodation space provided in the lower pouch 132, and the upper pouch 131 may cover an upper portion of the accommodation space. Further, when the electrolyte is injected, and the sealing part provided on an edge of each of the upper pouch 131 and the lower pouch 132 is sealed, the secondary battery 1 is manufactured.

Figure 2:
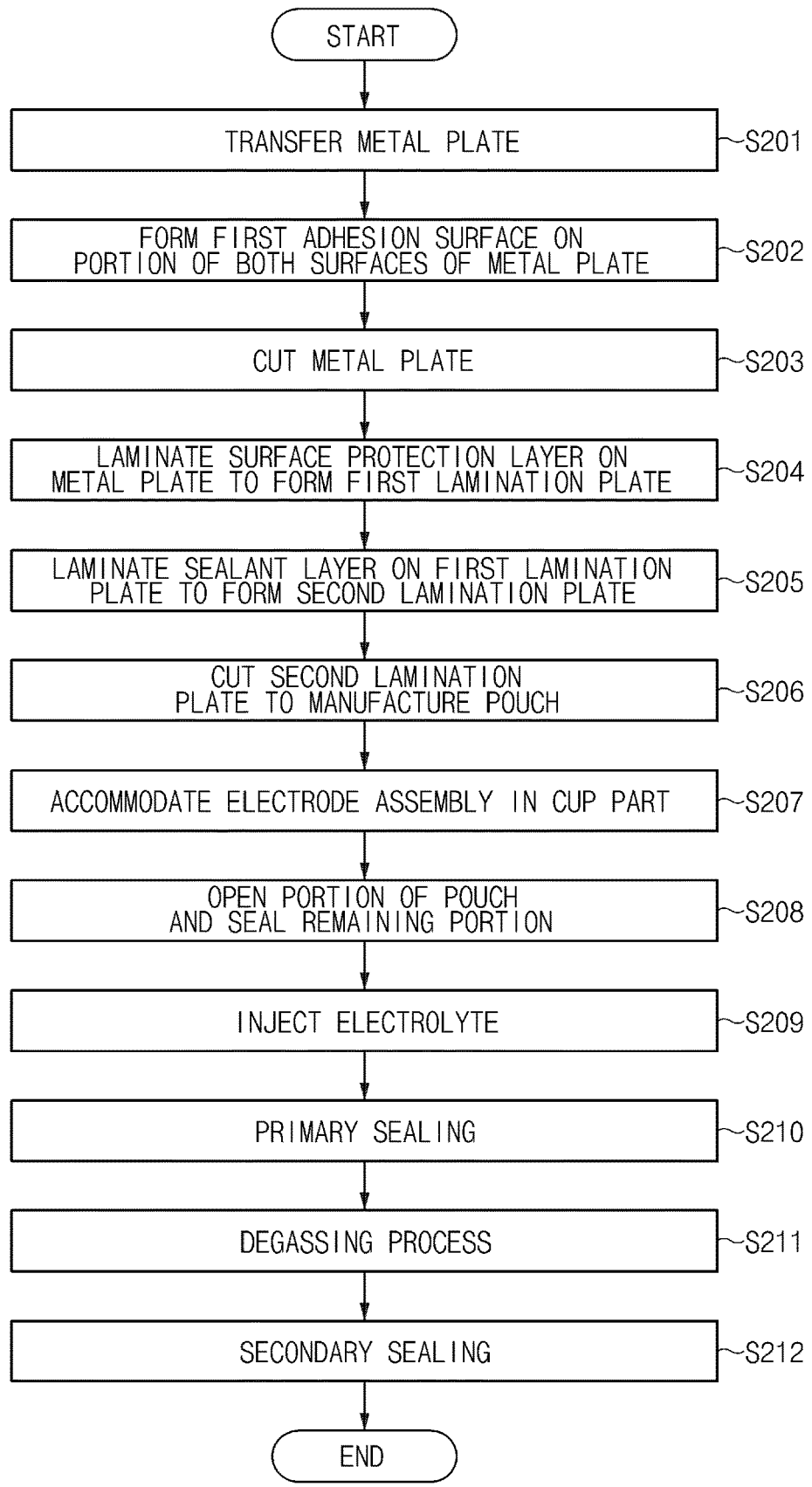
FIG. 2 is a flowchart illustrating a method for manufacturing the pouch type secondary battery according to an embodiment of the present invention.

FIG. 2 is a flowchart illustrating a method for manufacturing the pouch type secondary battery 1 according to an embodiment of the present invention.

In the pouch type secondary battery 1 according to an embodiment of the present invention, a gas barrier layer 21 is removed from a degassing part 134. Thus, manufacturing costs of the pouch for the secondary battery may be reduced, and a degassing aperture may be easily punched in the degassing part 134.

Hereinafter, each of steps illustrated in FIG. 2 will be described with reference to FIGS. 3 to 16.

Figure 3:
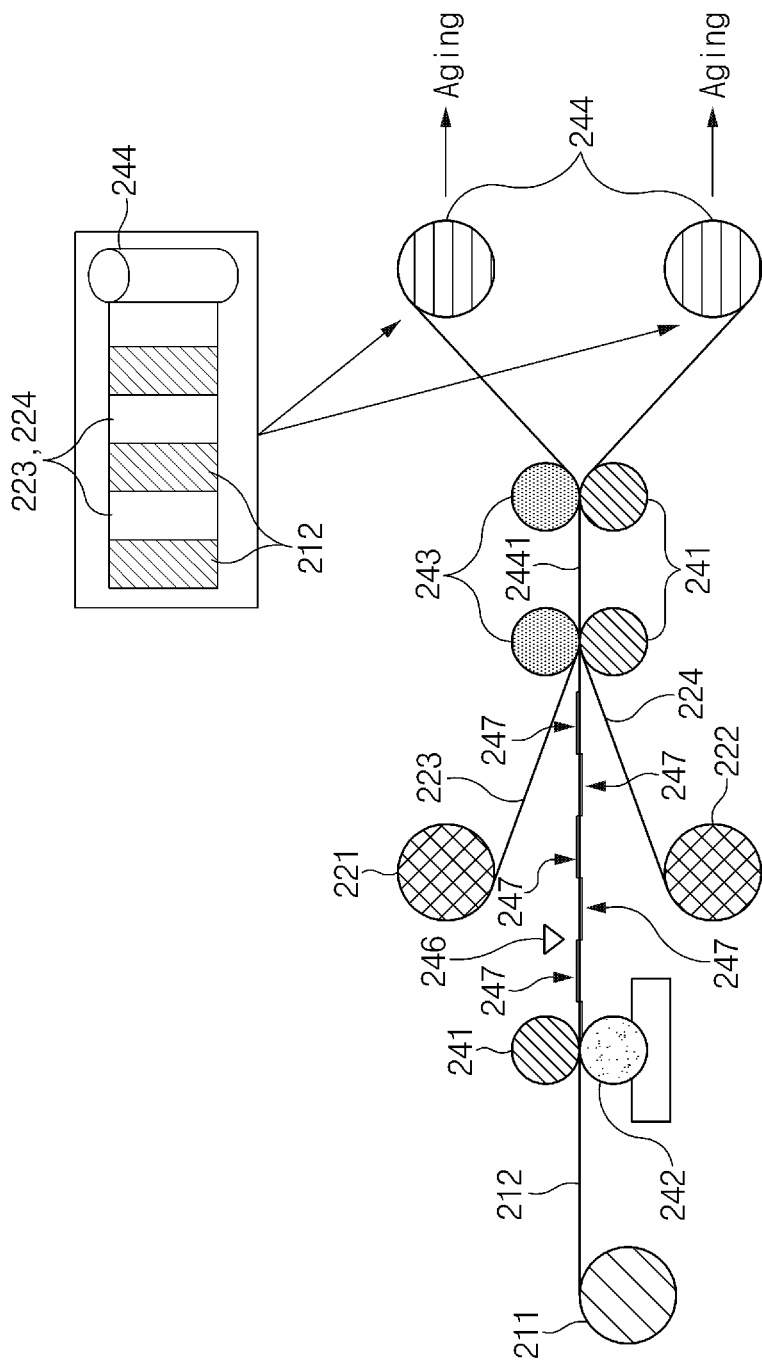
FIG. 3 is a schematic view illustrating a partial process of the method for manufacturing a pouch for the secondary battery according to an embodiment of the present invention.

FIG. 3 is a schematic view illustrating a partial process of the method for manufacturing a pouch for the secondary battery according to an embodiment of the present invention.

The battery case 13 according to an embodiment of the present invention may be a pouch made of a flexible material.

In general, the battery case 13 that accommodates the electrode assembly 10 includes a gas barrier layer 21, a surface protection layer 22, and a sealant layer 23. The gas barrier layer 21 blocks introduction and discharge of a gas and includes a metal. Thus, aluminum (Al) foil is generally used as the gas barrier layer. A surface protection layer 22 is disposed on the outermost layer and thus frequently cause friction and collision with the outside. Thus, a polymer such as a nylon resin, PET, or the like having abrasion resistance and heat resistance is generally used for the surface protection layer 22. Further, the sealant layer 23 is disposed on the innermost layer and directly contacts the electrode assembly 10. Thus, a polymer such as polypropylene (PP) or the like is generally used for the sealant layer.

The pouch type battery case 13 may be manufactured by processing a film having the above-described lamination structure into the form of a bag. Thus, when the electrode assembly 10 is accommodated in the pouch type battery case 13, the electrolyte is injected. Thereafter, when the upper pouch 131 and the lower pouch 132 may contact each other, and thermal compression is applied to the sealing part, the sealant layers may be bonded to each other to seal the battery case 13. In particular, since the sealant layer 23 directly contacts the electrode assembly 10, the sealant layer 23 may be required to have insulating properties. Further, since the sealant layer 23 contacts the electrolyte, the sealant layer 23 may be required to have corrosion resistance. Since the inside of the battery case 13 is completely sealed to prevent materials from moving between the inside and outside of the battery case 13, high sealability is required. In other words, the sealing part on which the sealant layers 23 are bonded to each other is required to have superior thermal bonding strength. In general, a polyolefin-based resin such as polypropylene (PP) or polyethylene (PE) may be used for the sealant layer 23. Particularly, polypropylene (PP) is excellent in mechanical properties such as tensile strength, rigidity, surface hardness, abrasion resistance, heat resistance, or the like and chemical properties such as corrosion resistance or the like, and thus is generally used for manufacturing the sealant layer 23.

To manufacture the battery case 13, as illustrated in FIG. 3, a metal plate 212 is unwound and transferred from a metal roll 211 in which the thin metal plate 212 is wound (S201). The metal plate 212 being transferred rotates while both surfaces of the metal plate 212 are pressed by a press roll 241 and a gravure roll 242.

An adhesive is applied to a rotating surface of each of the press roll 241 and the gravure roll 242. Thus, when the press roll 241 and the gravure roll 242 press both surfaces of the metal plate 212, the adhesive may be applied to the both surfaces of the metal plate 212 to form a first adhesion surface 247 (S202). According to an embodiment of the present invention, the adhesive is not continuously applied to the press roll 241 and the gravure roll 242, and the application of the adhesive and the stoppage of the application of the adhesive are repeated at predetermined intervals. If the applied positions of the adhesive on the press roll 241 and the gravure roll 242 correspond to each other, it is preferable that a period at which the adhesive is applied to the press roll 241 and a period at which the adhesive is applied to the gravure roll 242 are different by precisely a half period. However, the present invention is not limited thereto. For example, the periods may be exactly the same, or a position on which the adhesive is applied to the press roll 241 and a position on which the adhesive is applied to the gravure roll 242 may differ from each other by a predetermined distance. When the adhesive is applied to the metal plate 212 through the above-described method, as illustrated in FIG. 3, the first adhesion surface 247 in which the adhesive is applied to the metal plate 212 may be repeatedly and alternately formed on both surfaces at the predetermined distance.

When the first adhesion surface 247 is formed one by one on the both surfaces of the metal plate 212, a cutter 246 cuts the metal plate 212 with respect to a boundary of the first adhesion surface 247. Thus, pieces of the metal plate 212 on which the first adhesion surface 247 is formed on a top surface thereof and pieces of the metal plate 212 on which the first adhesion surface 247 is formed on a bottom surface thereof may be alternately disposed. A speed and position at which the cutter 246 cuts the metal plate 212 are determined based on a moving speed of the metal plate 212, a position at which the first adhesion surface 247 is formed, and a period in which the adhesive is applied to allow the cutter 246 to precisely cut the metal plate 212 with respect to the boundary of the first adhesion surface 247. Although the metal plate 212 is cut by the cutter 246 after the first adhesion surface 247 is formed on the metal plate 212 in FIGS. 2 and 3, the present invention is not limited thereto. For example, the metal plate 212 may be cut by the cutter 246 prior to the first adhesion surface 247 to be formed, i.e., the process sequence may be changed with each other.

A first surface protection roll 221 may be disposed on an upper portion of the metal plate 212, and a second surface protection roll 222 may be disposed on a lower portion of the metal plate 212, and the first and second surface protection plates 223 and 224 are unwound. When the adhesive is completely applied to the metal plate 212, as illustrated in FIG. 3, the first surface protection plate 223 unwound from the first surface protection roll 221 is laminated on the top surface of the metal plate 212, and the second surface protection plate 224 unwound from the second surface protection roll 222 is laminated on the bottom surface of the metal plate 212 (S204). In particular, the first surface protection plate 223 may adhere to the metal plate 212 on which the first adhesion surface 247 is formed on the top surface thereof, and the second surface protection plate 224 may adhere to the metal plate 212 on which the first adhesion surface 247 is formed on the bottom surface thereof.

After the surface protection plates 223 and 224 are laminated, a heating roll 243 and a press roll 241 may press the laminated metal plate 212 and the surface protection plates 223 and 224 to apply heat. Thus, the adhesive may be melted to further strengthen the adhesion between the metal plate 212 and the surface protection plates 223 and 224.

A first lamination plate 2441 on which the first surface protection plate 223 and the metal plate 212 are laminated may be wound around the first upper lamination roll 244 disposed at the upper side. A first lamination plate 2441 on which the second surface protection plate 224 and the metal plate 212 are laminated may be wound around the first lower lamination roll 244 disposed at the lower side.

Thus, the first lamination plate 2441 wound around the first upper lamination roll 244 has a shape in which the pieces of the metal plate 212 to which the adhesive is applied to the upper portion thereof are repeatedly attached while spaced the particular distance from each other on the bottom surface of the continuous first surface protection plate 223, and the first lamination plate 2441 wound around the first lower lamination roll 244 has a shape in which the pieces of the metal plate 212 to which the adhesive is applied to the lower portion thereof are repeatedly attached while spaced the particular distance from each other on the top surface of the continuous second surface protection plate 224. Accordingly, the first lamination plate 2441 wound around each of the first upper and lower lamination rolls 244 may have a shape the metal plate 212 is repeatedly attached and detached by the particular distance. The particular distance may be referred to as a predetermined interval at which the first adhesion surface 247 is alternately repeated and may be equal to a width of a cut piece of the metal plate 212.

As described above, since the metal plate 212 is cut with respect to the boundary of the first adhesion surface 247, the plurality of first lamination plates 2441 may be respectively wound around distinct first lamination rolls 244, i.e., each of the first upper and lower lamination rolls 244. Further, each first lamination roll 244 is subjected to an aging process for a predetermined time to remove residual stress.

Figure 4:
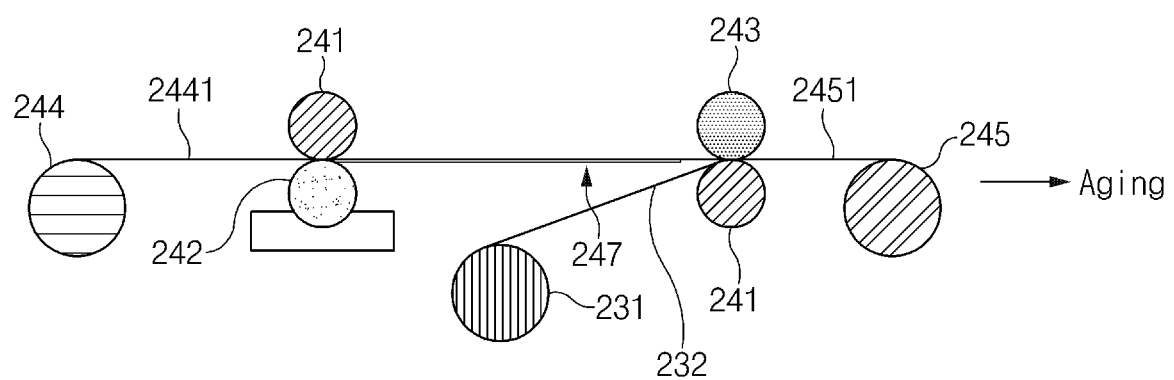
FIG. 4 is a schematic view illustrating a remaining process of the method for manufacturing the pouch for the secondary battery according to an embodiment of the present invention.

FIG. 4 is a schematic view illustrating a remaining process of the method for manufacturing the pouch for the secondary battery according to an embodiment of the present invention.

In the subsequent process, as illustrated in FIG. 4, the first lamination plate 2441 is unwound and transferred from each of the wound first lamination rolls 244. Further, the first lamination plate 2441 being transferred rotates while both surfaces of the first lamination plate 2441 are pressed by the press roll 241 and the gravure roll 242.

Further, the adhesive may be applied to a rotating surface of the gravure roll 242 to form a second adhesion surface 247. Thus, when the press roll 241 and the gravure roll 242 press both surfaces of the metal plate 212, the adhesive may be applied to the bottom surface of the first lamination plate 2441.

A sealant roll 231 may be disposed on a lower portion of the first lamination plate 2441 and unwound a sealant plate 232. When the adhesive is completely applied to the first lamination plate 2441, as illustrated in FIG. 4, the sealant plate 232 unwound from the sealant roll 231 is laminated on the bottom surface of the first lamination plate 2441 to form a second lamination plate 2451 (S205).

According to an embodiment of the present invention, unlike the above-described process, the sealant plate 232 may be laminated on only the surface of the first lamination plate 2441, on which the metal plate 212 is laminated, but may not be laminated on the other surface of the first lamination plate 2441, on which the metal plate 212 is not laminated. Thus, to form the adhesion layer on only the surface of the first lamination plate 2441, on which the metal plate 212 is laminated, the adhesive may be applied to only the rotating surface of the gravure roll 242 but may not be applied to a rotating surface of the press roll 241. However, the present invention is not limited thereto. For example, if another plate is intended to be additionally laminated on the surface of the first lamination plate 2441, on which the metal plate 212 is not laminated, the adhesive may also be applied to the rotating surface of the press roll 241.

Further, unlike the above-described process, the application of the adhesive and the stoppage of the application of the adhesive are not repeated on the sealant layer 23 at predetermined intervals. In other words, the second adhesion surface 247 is continuously formed on the entire bottom surface of the first lamination plate 2441, and the sealant layer 23 may also be continuously laminated.

After the sealant plate 232 is laminated, the heating roll 243 and the press roll 241 may press the first lamination plate 2441 and the sealant plate 232 and apply heat. Thus, the adhesive may be melted to further strengthen the adhesion between the first lamination plate 2441 and the sealant plate 232. The second lamination plate 2451 on which the first lamination plate 2441 and the sealant plate 232 are laminated may be wound around the second lamination roll 245. The second lamination roll 245 is subjected to an aging process for a predetermined time to remove residual stress.

Figure 5:
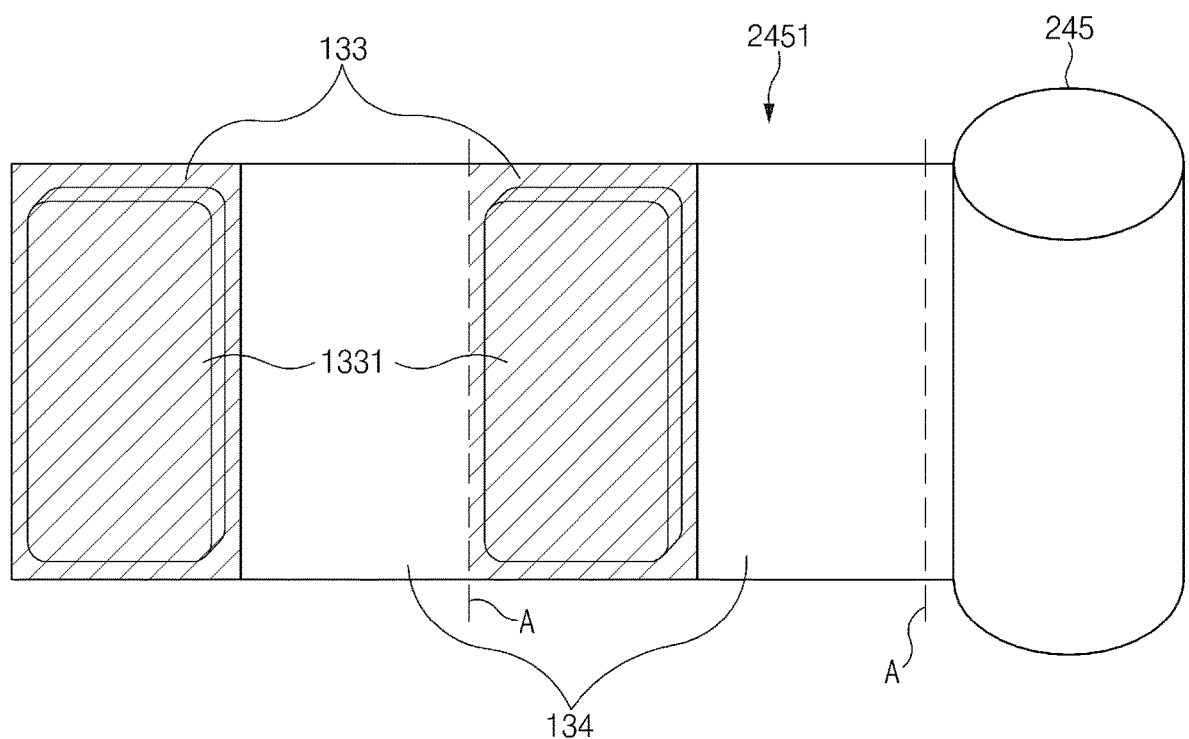
FIG. 5 is a schematic view illustrating a second lamination roll manufactured according to the method for manufacturing the pouch for the secondary battery according to an embodiment of the present invention.

FIG. 5 is a schematic view illustrating the second lamination roll manufactured according to the method for manufacturing the pouch for the secondary battery according to an embodiment of the present invention.

In the above-described method, as illustrated in FIG. 5, when the second lamination roll 245 is formed, and the second lamination plate 2451 is unwound again from the second lamination roll 245, the cup part 133 and the degassing part 134 may be repeatedly and alternately formed spaced by a particular distance.

As described above, the cup part 133 is a portion in which an accommodation space 1331 that accommodates the electrode assembly 10 is provided. The degassing part 134 is a portion in which a degassing aperture is formed for a degassing process. According to an embodiment of the present invention, the metal plate 212 may be laminated in only a portion of the cup part 133 but may not be laminated on the degassing part 134.

When the second lamination plate 2451 is unwound from the second lamination roll 245, as illustrated in FIG. 5, the accommodation space 1331 in which the electrode assembly 10 is accommodated may be formed in the cup part 133 using a punch or the like. Further, a cutting line A is set one by one for each of two boundaries between the cup part 133 and the degassing part 134 (S206). For example, if the boundary is initially selected as the cutting line A such that the degassing part 134 is disposed at a left side with respect to the cutting line A, and the cup part 133 is disposed at a right side with respect to the cutting line A, all boundaries are set as the cutting lines A such that the degassing part 134 is disposed at the left side, and the cup part 133 is disposed at the right side while the second lamination plate 2451 is unwound. On the other hand, if the boundary is initially selected as the cutting line A such that the cup part 133 is disposed at the left side with respect to the cutting line A, and the degassing part 134 is disposed at the right side with respect to the cutting line B, all boundaries are set as the cutting lines A such that the cut part 133 is disposed at the left side, and the degassing part 134 is disposed at the right side while the second lamination plate 2451 is unwound. The cutting line A is preferably perpendicular to a longitudinal direction of the second lamination plate 2451. Accordingly, the manufacturing of the pouch for the secondary battery, which includes a cup part 133 and a degassing part 134, according to an embodiment of the present invention is completed.

Figure 6:
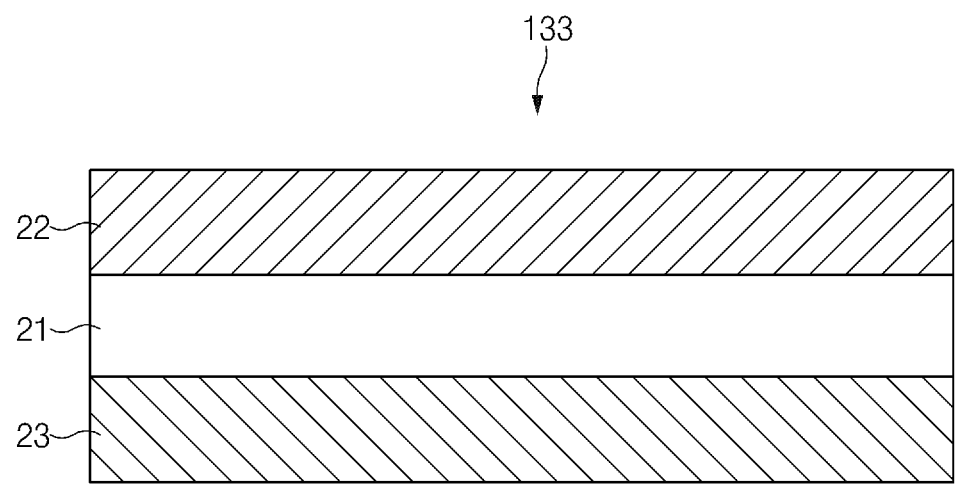
FIG. 6 is an enlarged view illustrating a side surface of the cup part of the pouch for the secondary battery according to an embodiment of the present invention.
Figure 7:
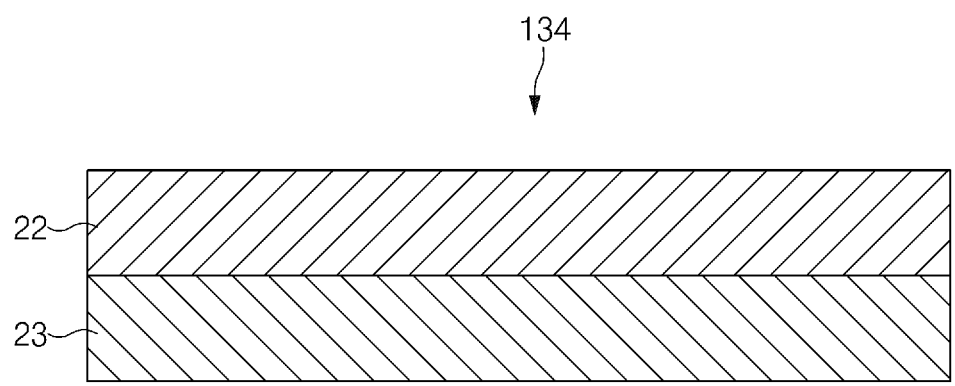
FIG. 7 is an enlarged view illustrating a degassing part of the pouch for the secondary battery according to an embodiment of the present invention.

FIG. 6 is an enlarged view illustrating a side surface of the cup part 133 of the pouch for the secondary battery according to an embodiment of the present invention, and FIG. 7 is an enlarged view illustrating the degassing part 134 of the pouch for the secondary battery according to an embodiment of the present invention.

In view of the above, according to an embodiment of the present invention, the metal plate 212 may be laminated in only a portion of the cup part 133 but may not be laminated on the degassing part 134.

Thus, when the manufacturing of the pouch for the secondary battery according to an embodiment of the present invention is completed according to the above-described method, as illustrated in FIG. 6, the cup part 133 is formed by the surface protection layer 22, the gas barrier layer 21, and the sealant layer 23 sequentially laminated. Further, as illustrated in FIG. 7, the degassing part 134 is formed by only the surface protection layer 22 and the sealant layer 23 laminated without the gas barrier layer 21.

Figure 8:
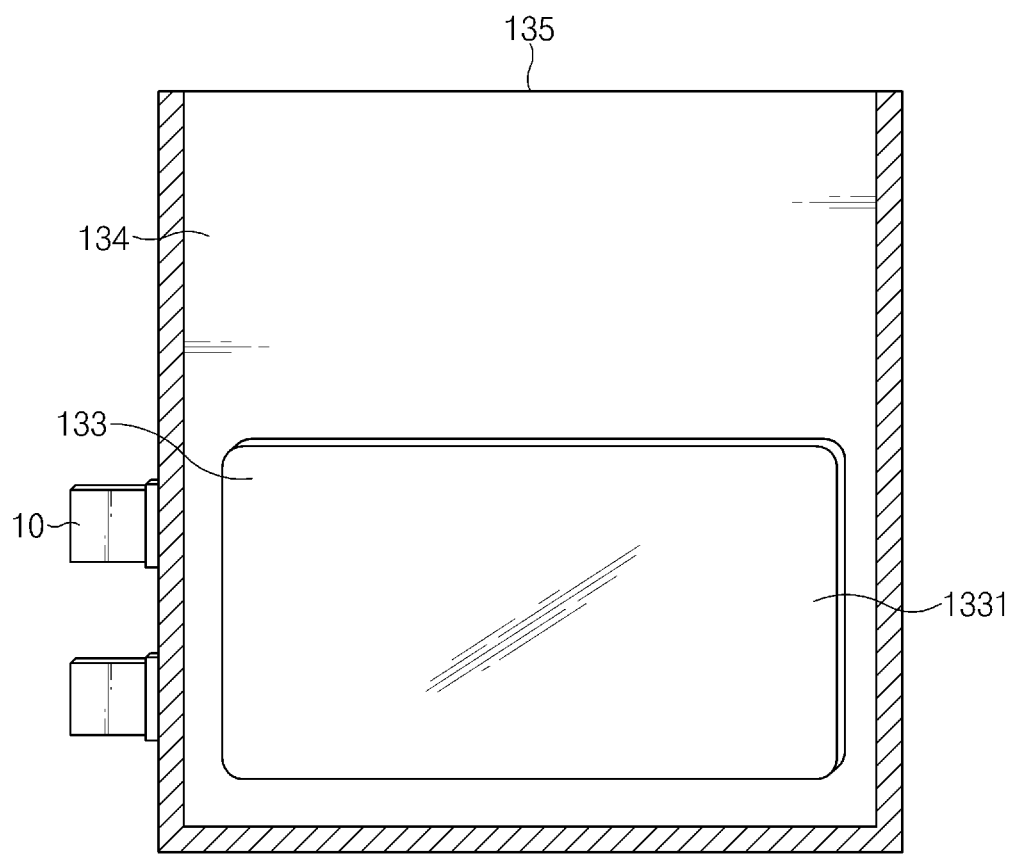
FIG. 8 is a schematic view illustrating a state in which only a portion of an edge is sealed after an electrode assembly is accommodated in the pouch for the secondary battery according to an embodiment of the present invention.

FIG. 8 is a schematic view illustrating a state in which only a portion of an edge is sealed after the electrode assembly 10 is accommodated in the pouch for the secondary battery according to an embodiment of the present invention.

When the manufacturing of the pouch for the secondary battery according to an embodiment of the present invention is completed according to the above-described method, as described above, the electrode assembly 10 is accommodated in the accommodation space 1331 provided in the cup part 133 of the pouch (S207). In particular, the electrode assembly 10 may be accommodated between two cup parts 133 of which openings 135 are disposed to face each other. After the electrode assembly 10 is accommodated, as illustrated in FIG. 8, a portion of the edge of the pouch is open, and a remaining portion of the edge is sealed (S208).

As described below, the portion of the edge of the pouch is open to form the opening 135 to allow an electrolyte to be injected into the pouch. The electrolyte may be preferably injected downward from an upper side of the pouch to allow the electrode assembly 10 to be sufficiently immersed in the electrolyte. Further, to prevent the electrolyte from leaking, the open portion of the edge of the pouch may be directed upward, and the remaining sealed portion of the edge may be directed downward and laterally. After the electrolyte is injected, the degassing process is performed. In particular, to prevent the electrolyte injected from leaking through the degassing aperture while a gas is removed, the degassing aperture formed in the degassing part 134 may be preferably formed in the upper portion of the pouch.

Thus, as illustrated in FIG. 8, the pouch may be disposed to allow the degassing part 134 to be directed upward, and the cup part 133 to be directed downward. Further, a portion of the edge of the pouch, which is directed upward and included in an edge of the degassing part 134, may not be sealed but remain open. A remaining portion that is directed downward and laterally may be preferably sealed.

Figure 9:
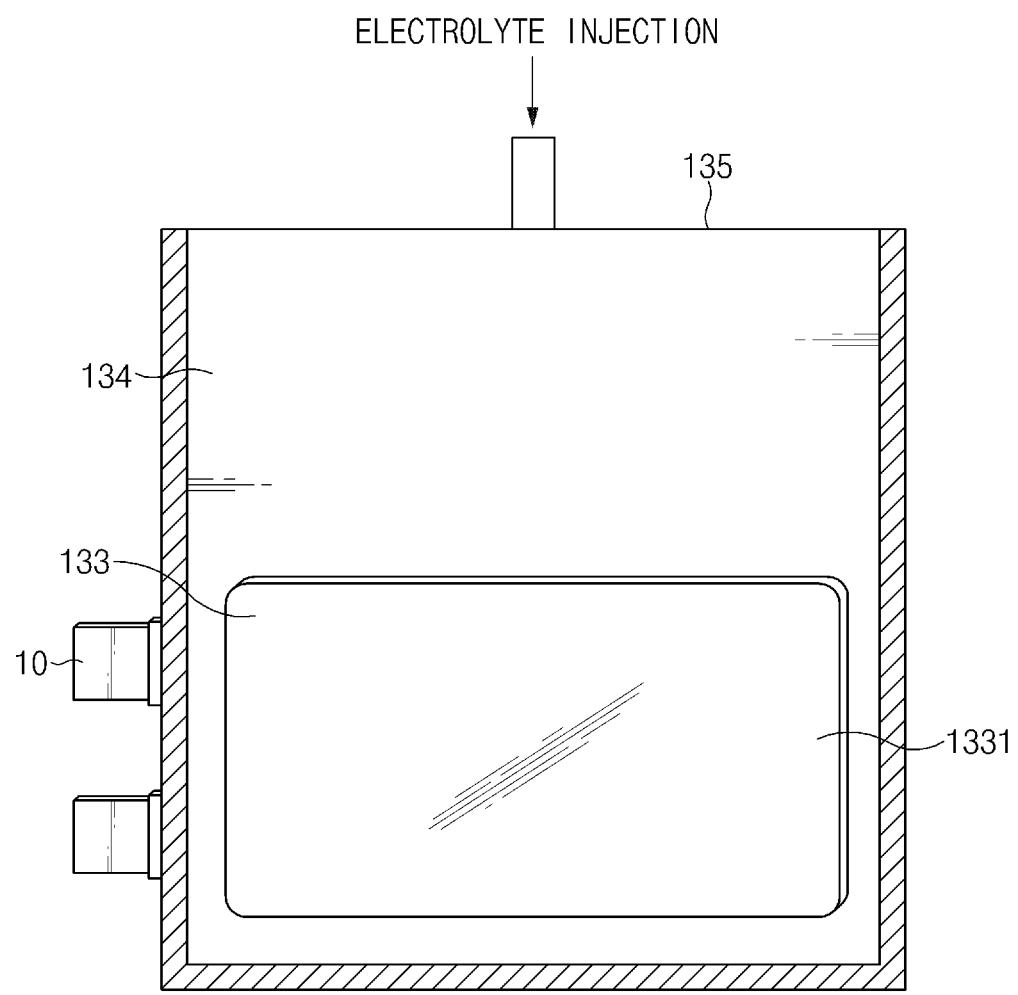
FIG. 9 is a schematic view illustrating a state in which an electrolyte is injected into the pouch for the secondary battery according to an embodiment of the present invention.

FIG. 9 is a schematic view illustrating a state in which the electrolyte is injected into the pouch for the secondary battery according to an embodiment of the present invention.

As illustrated in FIG. 9, the electrolyte is injected into the pouch through the opening 135 formed in the pouch (S209). As described above, the electrolyte may be preferably injected downward from the upper side of the pouch to allow the electrode assembly 10 to be sufficiently immersed in the electrolyte, and to prevent the electrolyte from leaking.

Figure 10:
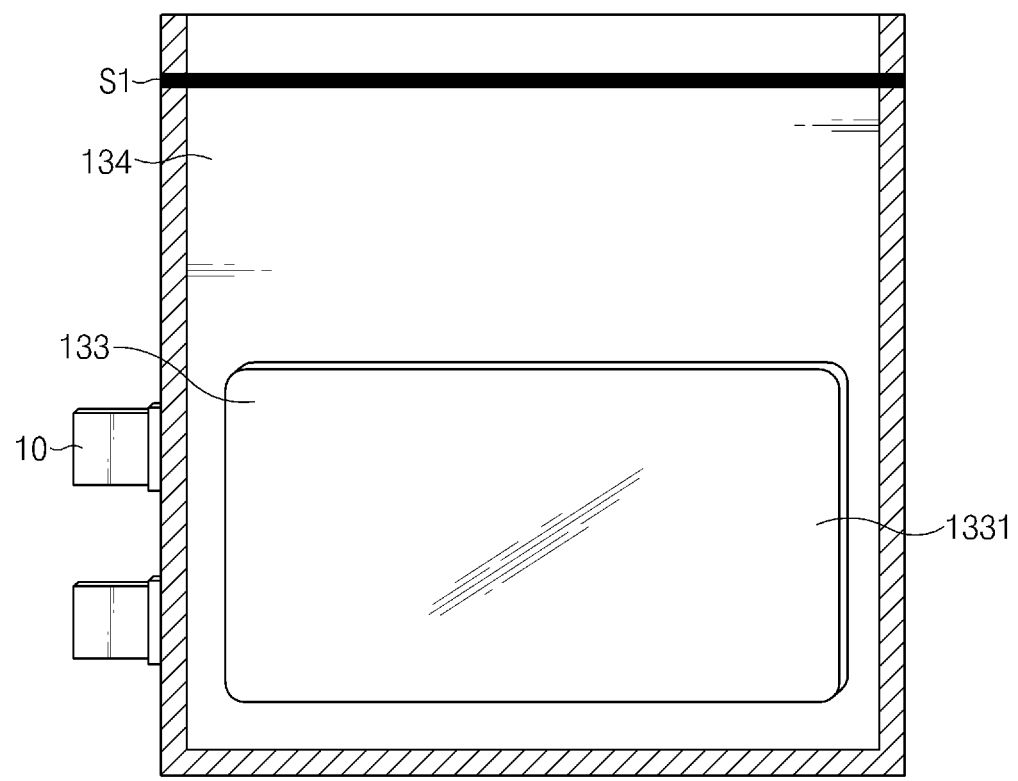
FIG. 10 is a schematic view illustrating a state in which an opening of the pouch for the secondary battery is primarily sealed according to an embodiment of the present invention.

FIG. 10 is a schematic view illustrating a state in which the opening 135 of the pouch for the secondary battery is primarily sealed according to an embodiment of the present invention.

The electrolyte is injected into the pouch, and the opened opening 135 is primarily sealed as illustrated in FIG. 10 to form a primary sealed part S1 (S210). Further, a formation process is performed. The formation process is a process of finalizing charging to allow the secondary battery 1 to be capable of supplying electric power.

Since the formation process is performed after the primary sealed portion S1 is formed, and the pouch is completely sealed, the charging rate may be increased, and the manufacturing of the secondary battery 1 may be completed within a predetermined process time by promptly discharging the gas.

Figure 11:
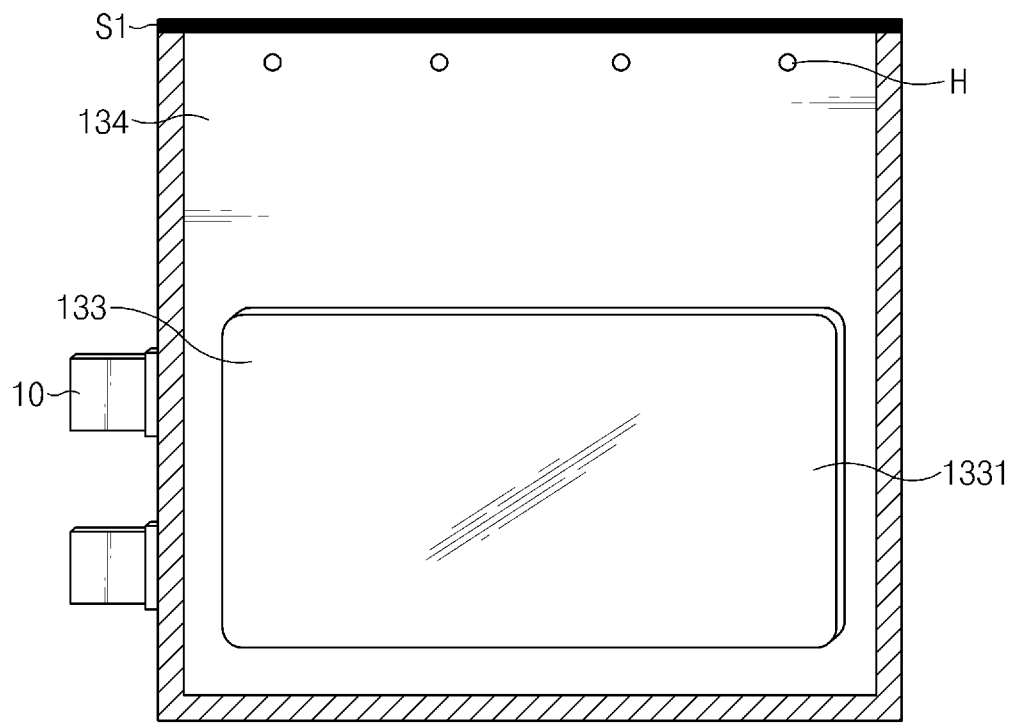
FIG. 11 is a schematic view illustrating a state in which a degassing aperture is punched in a degassing part of the pouch for the secondary battery according to an embodiment of the present invention.

FIG. 11 is a schematic view illustrating a state in which the degassing aperture is punched in the degassing part 134 of the pouch for the secondary battery according to an embodiment of the present invention.

When the formation process is completed, a gas is generated within the pouch. Thus, as illustrated in FIG. 11, a degassing aperture H is punched in one surface of the pouch to perform a degassing process of discharging the gas (S211). In particular, the degassing aperture H is punched in the degassing part 134. According to an embodiment of the present invention, since the gas barrier layer 21 including the metal is omitted from the degassing part 134, the thickness of the degassing part 134 may be decreased, and the degassing part 134 may be made of only a polymer so that the degassing aperture H is easily punched.

Figure 12:
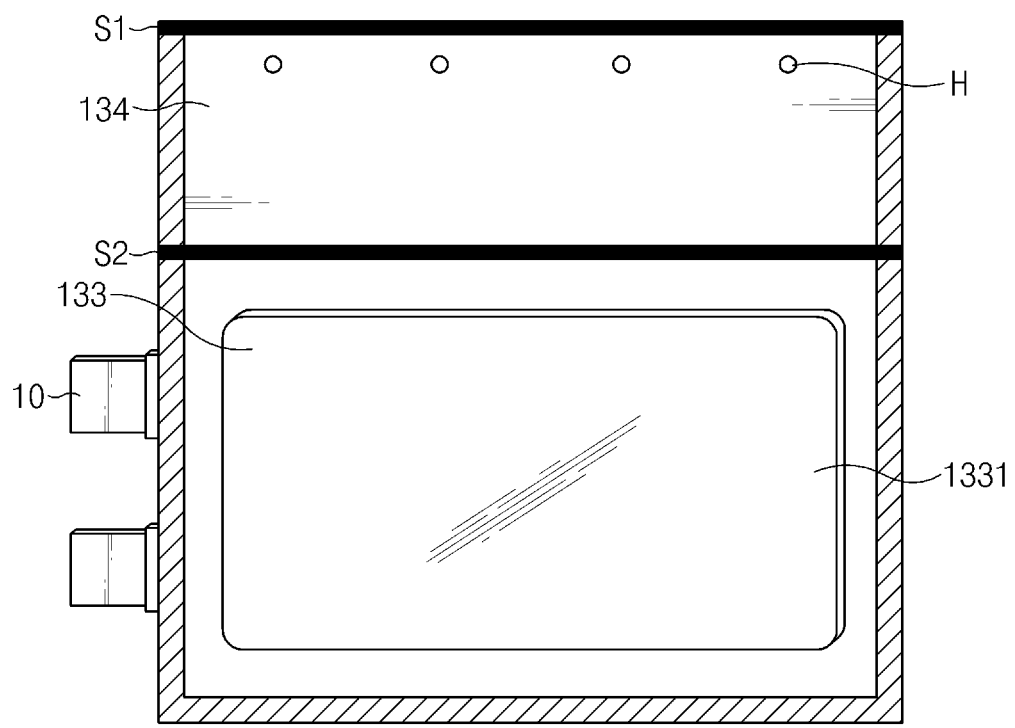
FIG. 12 is a schematic view illustrating a state in which the opening of the pouch for the secondary battery is secondarily sealed according to an embodiment of the present invention.

FIG. 12 is a schematic view illustrating a state in which the opening 135 of the pouch for the secondary battery is secondarily sealed according to an embodiment of the present invention.

As described above, since the degassing aperture H is punched in the degassing part 134 after the primary sealing, the inside of the pouch may be opened again, and thus, the electrolyte within the pouch may leak to the outside. Thus, as illustrated in FIG. 12, a portion of the pouch, in which the opening 135 is formed, may be secondarily sealed to form a secondary sealed part S2 (S212). In particular, the secondary sealed part S2 may be preferably formed between the cup part 133 and the degassing aperture H to seal the interior of the cup part 133.

Figure 13:
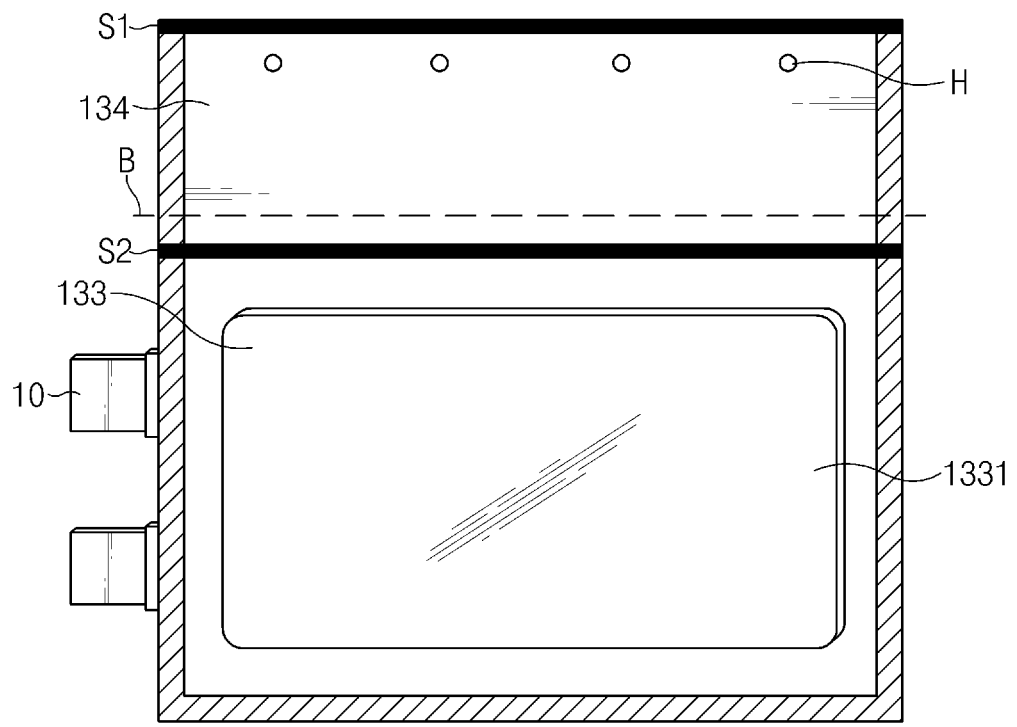
FIG. 13 is a schematic view illustrating a state in which a portion between the degassing aperture of the pouch for the secondary battery and a secondarily sealed part is cut according to an embodiment of the present invention.
Figure 14:
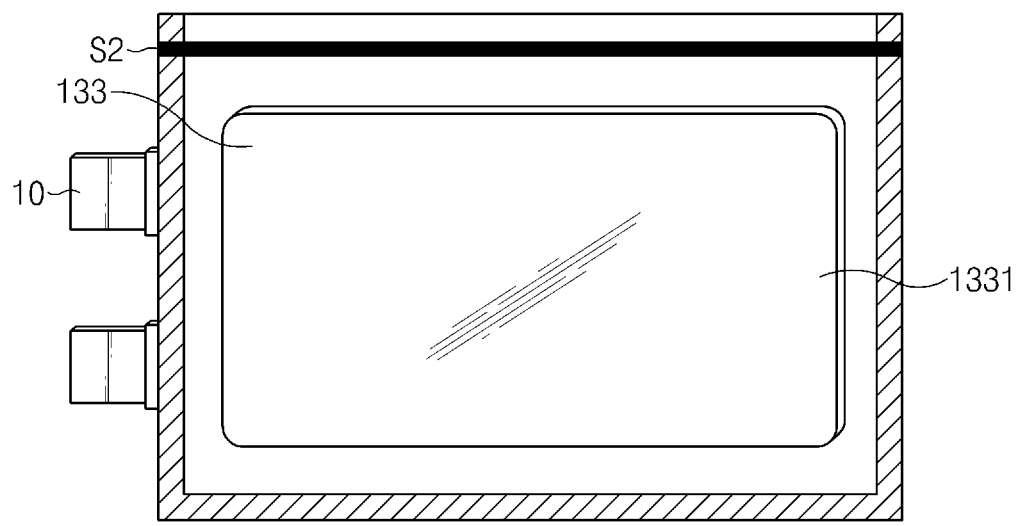
FIG. 14 is a schematic view illustrating a state in which the pouch type secondary battery is completely manufactured according to an embodiment of the present invention.

FIG. 13 is a schematic view illustrating a state in which a portion between the degassing aperture H of the pouch for the secondary battery and the secondary sealed part S2 is cut according to an embodiment of the present invention, and FIG. 14 is a schematic view illustrating a state in which the pouch type secondary battery is completely manufactured according to an embodiment of the present invention.

When the secondary sealed part S2 is formed, as illustrated in FIG. 13, a cutting line B is set and cut between the degassing aperture H and the secondary sealed part S2. Thus, as illustrated in FIG. 14, the manufacturing of the pouch type secondary battery 1 according to an embodiment of the present invention is completed. Only the cup part 133 in which the electrode assembly 10 is accommodated may remain, and the cut degassing part 134 may be discarded. According to an embodiment of the present invention, since the gas barrier layer 21 including the metal is not laminated on the degassing part 134 that is discarded as described above, the manufacturing costs of the pouch for the secondary battery may be reduced, and the production rate of the secondary battery 1 may be increased.

Figure 15:
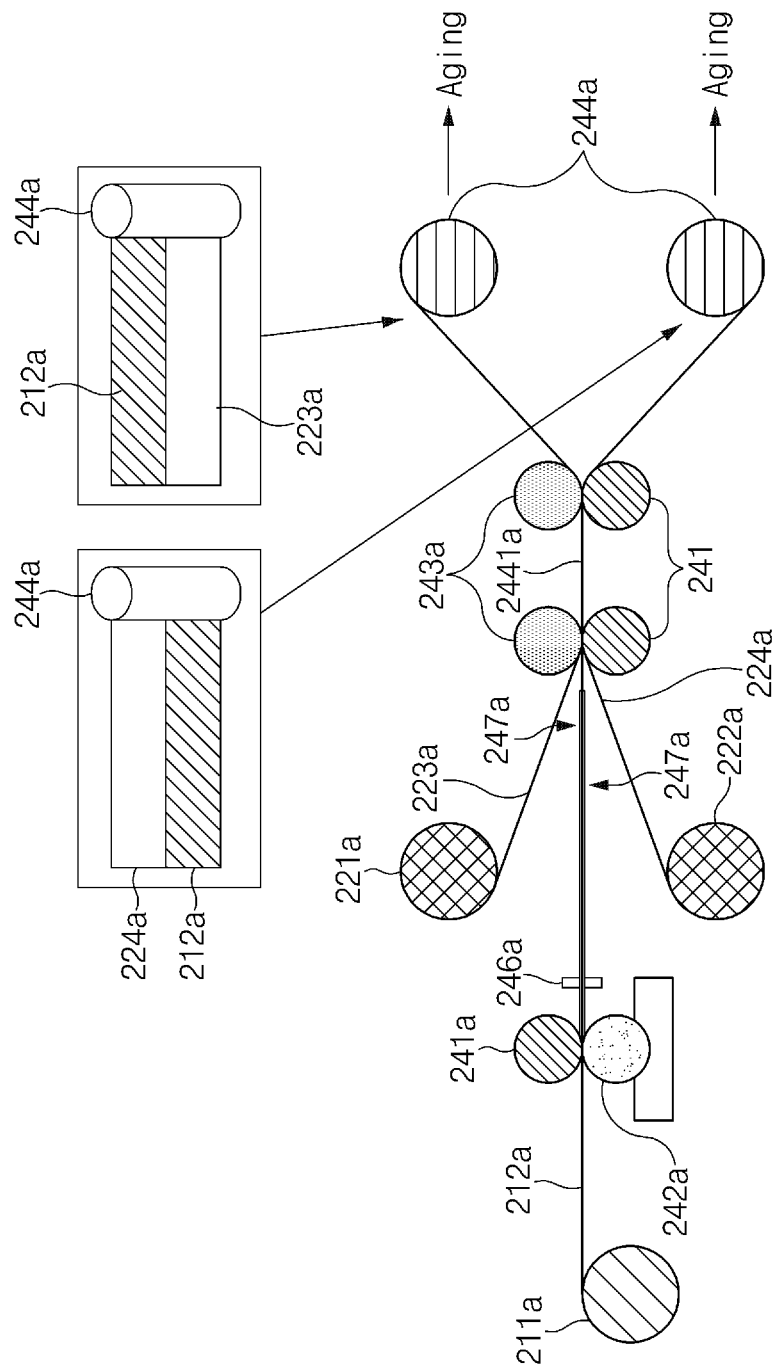
FIG. 15 is a schematic view illustrating a partial process of a method for manufacturing a pouch for a secondary battery according to another embodiment of the present invention.

FIG. 15 is a schematic view illustrating a partial process of a method for manufacturing a pouch for a secondary battery according to another embodiment of the present invention.

Hereinbelow, a method for manufacturing a pouch for a secondary battery according to another embodiment of the present invention will be described. Duplicate description as the method for manufacturing the pouch for the secondary battery according to the foregoing embodiment of the present invention will be omitted. However, the omission of the description is for convenience of description only and is not intended to limit the scope of the rights.

When the pouch for the secondary battery according to another embodiment of the present invention is manufactured, as illustrated in FIG. 15, first, a metal plate 212a is unwound and transferred from a metal roll 211a around which the thin metal plate 212a is wound. The metal plate 212a being transferred rotates while both surfaces of the metal plate 212a are pressed by a press roll 241a and a gravure roll 242a.

Further, an adhesive is applied to a rotating surface of each of the press roll 241a and the gravure roll 242a. Thus, when the press roll 241a and the gravure roll 242a press the both surfaces of the metal plate 212, the adhesive may be applied to the both surfaces of the metal plate 212a to form a first adhesion surface 247a. In particular, according to another embodiment of the present invention, the adhesive is not applied to the entire rotating surface of the press roll 241a and the gravure roll 242a but is applied to one side and the other side with respect to central lines of the rotating surfaces of the press roll 241a and the gravure roll 242a. For example, if the adhesive is applied to a left side of the press roll 241a with respect to the central line of the rotating surface, the adhesive is applied to a right side of the gravure roll 242a with respect to the central line of the rotating surface. Alternatively, if the adhesive is applied to the right side of the press roll 241a with respect to the central line of the rotating surface, the adhesive is applied to the left side of the gravure roll 242a with respect to the central line of the rotating surface. The left side and the right side are determined on the basis of when the metal plates 212a are faced in a longitudinal direction. When the adhesive is applied to the metal plate 212a in this manner, as illustrated in FIG. 15, the adhesive is applied to only a top surface at the left side and only a bottom surface at the right side or is applied to only the top surface at the right side and only the bottom surface at the left side with respect to a central axis formed on the metal plate 212a along the longitudinal direction. Thus, a first adhesion surface 247a is formed on only one surface of the metal plate 212a at the left side and only the other surface of metal plate 212a at the right side with respect to the central axis.

Whenever the first adhesion surface 247a is formed on both surfaces of the metal plate 212a, a cutter 246a cuts the metal plate 212a with respect to a boundary of the first adhesion surface 247a. As a result, the cutter 246a may cut the metal plate 212a along the central axis formed in the longitudinal direction of the metal plate 212a. Thus, pieces of the metal plate 212a on which the first adhesion surface 247a is formed on the top surface thereof and pieces of the metal plate 212a on which the first adhesion surface 247a is formed on the bottom surface thereof may be separated from each other to the left and right sides. The cutter 246a is not required to move in left, right, front, and back directions with respect to the metal plate 212a. Thus, the cutter 246 may cut the metal plate 212a while reciprocating in the upward and downward directions or while rotating.

Although the metal plate 212*a* is cut by the cutter 246*a* after the first adhesion surface 247*a* is formed on the metal plate 212*a* in FIG. 15, the present invention is not limited thereto. For example, the metal plate 212*a* may be cut by the cutter 246*a* prior to the first adhesion surface 247*a* to be formed, i.e., the process sequence may be changed with each other.

When the adhesive is completely applied to the metal plate 212*a*, first and second surface protection plates 223*a* and 224*a* are laminated as illustrated in FIG. 15, and a heating roll 243*a* and a press roll 241*a* press the laminated metal plate 212*a* and the laminated surface protection plates 223*a* and 224*a* and apply heat.

A first lamination plate 2441*a* on which the first surface protection plate 223*a* and the metal plate 212*a* are laminated is wound around a first upper lamination roll 244*a* disposed on the upper side, and also, a first lamination plate 2441*a* on which the second surface protection plate 224*a* and the metal plate 212*a* are laminated is wound around the first lower lamination roll 244*a* disposed on the lower side. All of the first lamination plates respectively wound around the first upper and lower lamination rolls 224*a* may have shapes in which the metal plate 212*a* is continuously attached to only the left or right side of the surface protection plates 223*a* and 224*a*.

Figure 16:
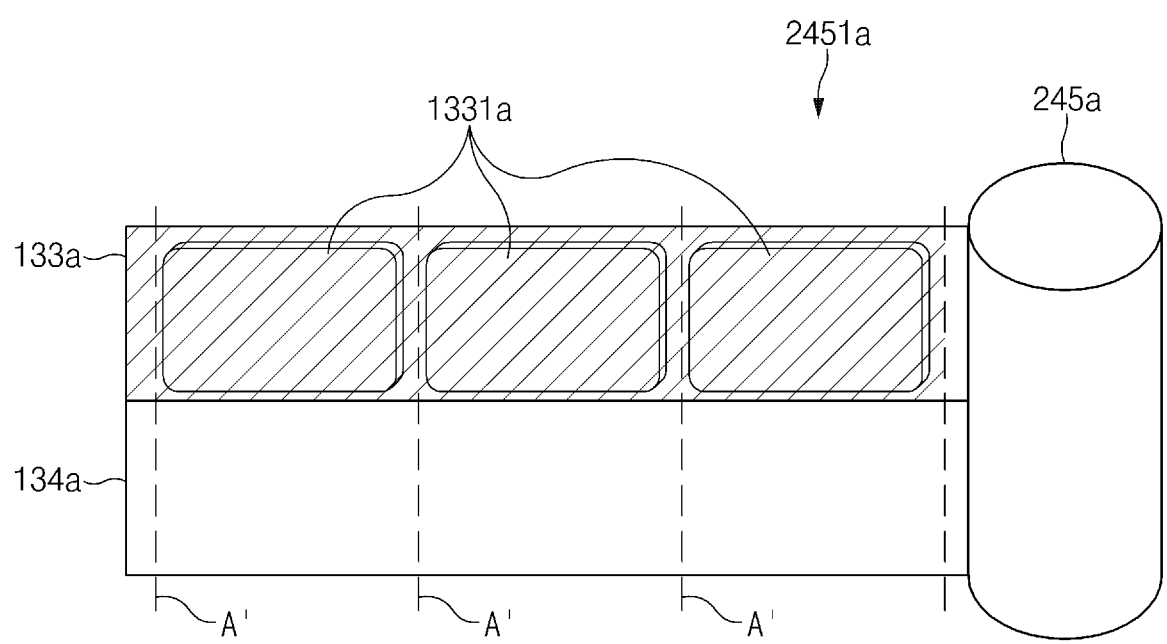
FIG. 16 is a schematic view illustrating a second lamination roll manufactured according to the method for manufacturing the pouch for the secondary battery according to another embodiment of the present invention.

FIG. 16 is a schematic view illustrating a second lamination roll 245*a* manufactured according to the method for manufacturing the pouch for the secondary battery according to another embodiment of the present invention.

The wound first lamination roll 244*a* is wound around the second lamination roll 245*a* through the remaining process described with reference to FIG. 4. Further, as illustrated in FIG. 16, when a second lamination plate 2451*a* is unwound again from the second lamination roll 245*a*, a cup part 133*a* or a degassing part 134*a* are formed at only the left side or right side with respect to a central axis formed along the longitudinal direction.

When the second lamination plate 2451*a* is unwound from the second lamination roll 245*a*, as illustrated in FIG. 16, an accommodation space 1331*a* in which an electrode assembly 10 is accommodated may be formed in the cup part 133*a* using a punch or the like. Further, a cutting line A' is set and cut between the accommodation spaces 1331*a*. The cutting line A' is preferably perpendicular to the longitudinal direction of the second lamination plate 2451*a*. Thus, the manufacturing of the pouch for the secondary battery, which includes a cup part 133*a* and a degassing part 134*a*, according to another embodiment of the present invention is completed.

Although not shown, the pouch type secondary battery according to embodiments of the present invention may further include a protection circuit module. The protection circuit module is seated on the outside of the pouch for the secondary battery, particularly, a portion at which an electrode tab 11 is formed, and is electrically connected to a positive electrode tab 111 and a negative electrode tab 112 of the electrode assembly 10 to control charging/discharging and malfunction of the electrode assembly 10. For example, the protection circuit module may interrupt overcurrent when the overcurrent flows to the electrode assembly 10. The protection circuit module may further include an input/output terminal to perform the charging/discharging of the secondary battery. The protection circuit module may generally have a structure including various protection circuits.

After the pouch type secondary battery according to embodiments of the present invention is manufactured as described above, the secondary battery may be inserted into a separately manufactured pack case. However, the present invention is not limited thereto. For example, a pack process may be performed to allow the pouch for the secondary battery itself to serve as the pack case. Although not shown, in the process of manufacturing the pouch for the secondary battery according to embodiments of the present invention, a secondary sealed part S2 is formed on the pouch for the secondary battery according to the step S212, and subsequently, the degassing part 134 may be wound around the cup part 133 without setting a cutting line B on the degassing part 134 and being cut.

In particular, the degassing part 134 may have a width greater than twice a width of the cup part 133. For example, in the method for manufacturing the pouch for the secondary battery according to another embodiment of the present invention, when the cutter 246*a* cuts the metal plate 212*a*, the metal plate 212*a* may not be cut along the central axis formed along the longitudinal direction of the metal plate 212*a* but may be moved in parallel by a predetermined distance from the central axis to one side to cut the metal plate 212*a*. Alternatively, the cutter 246*a* may be provided in plurality. The plurality of cutters 246 may move in parallel symmetrically with respect to the central axis by a predetermined distance to cut the metal plate 212*a* at the same time. In this manner, the width of the degassing part 134 may be manufactured wider than twice the width of the cup part 133, and the degassing part 134 may be wound one turn around the cup part 133.

The pouch may further include upper and lower molding parts to serve as the pack case by itself. The upper and lower molding parts are formed by molding the pouch type secondary battery through a hot melt method using a hot melt. Further, the pouch for the secondary battery is maintained in a tube shape.

The hot melt used for the upper and second molding parts may be a hot-melt adhesive. For example, non-volatile, non-flammable, and thermoplastic resin that is 100% solid at room temperature may be applied and compressed to a material to be adhered in a liquid phase at a high temperature and then cooled and solidified with several seconds to achieve adhesion.

The hot melt may be made of a material preferably selected from a group consisting of an ethylene-vinyl acetate copolymer (EVA)-based material, a polyamide-based material, a polyester-based material, a rubber-based material, and a polyurethane-based material.

The upper molding part is a portion at which the protection circuit module is disposed in the pouch for the secondary battery, in particular, the upper part is a portion that is molded through the hot melting method. An input/output terminal of the protection circuit module is formed on the upper molding part to be exposed.

The lower molding part is a portion at which a lower portion of the pouch type secondary battery is molded by the hot melting method. As described above, when the pack process is performed using the degassing part 134, the degassing part 134 may be wound around a side portion of the cup part 133 to protect the side portion of the pouch for the secondary battery against an external impact, but a lower portion of the pouch may be exposed. Thus, the lower molding part may be molded to the lower portion of the pouch of the secondary battery to protect the lower portion against the external impact.

Those with ordinary skill in the technical field of the present invention pertains will understand that the present invention can be carried out in other specific forms without changing the technical ideas or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a secondary battery, the method comprising steps of:
   forming a first adhesion surface by applying an adhesive to a portion of both surfaces of a metal plate while the metal plate is transferred;
   cutting the metal plate;
   forming a plurality of first lamination plates by respectively laminating a plurality of surface protection plates on the both surfaces of the metal plate;
   forming a second adhesion surface by applying the adhesive on an entire surface of at least one of the plurality of first lamination plates, on which the metal plate is laminated;
   forming a second lamination plate by laminating a sealant plate on the second adhesion surface to;
   cutting the second lamination plate to manufacture a pouch comprising a cup part in which the metal plate exists and a degassing part in which no metal plate exists;
   accommodating an electrode assembly in an accommodation space formed in the cup part;
   opening a portion of an edge of the pouch to form an opening and sealing a remaining portion of the edge;
   injecting an electrolyte through the opening;
   primarily sealing the opening;
   punching a degassing aperture in the degassing part;
   performing a degassing process; and
   secondarily sealing the degassing part.

2. The method of claim 1, wherein, in the step of cutting the metal plate, the metal plate is cut with respect to a boundary of the first adhesion surface.

3. The method of claim 2, wherein, in the step of forming the first adhesion surface on a portion of the metal plate, the first adhesion surface is repeatedly and alternately formed on the both surfaces of the metal plate at a predetermined distance.

4. The method of claim 2, wherein, in the step of forming the first adhesion surface on a portion of the metal plate, the first adhesion surface is formed on only one surface of the metal plate at a left side and only the other surface of the metal plate at a right side with respect to a central axis formed along a longitudinal direction of the metal plate.

5. The method of claim 1, wherein, after the step of secondarily sealing the degassing part is performed, the degassing part is cut and removed.

6. The method of claim 1, wherein, after the step of secondarily sealing the degassing part is performed, the degassing part is wound around a side portion of the cup part.

7. A pouch for a secondary battery, the pouch comprising:
   a cup part configured to accommodate an electrode assembly, wherein the cup part is formed by laminating a surface protection layer, a gas barrier layer comprising a metal, and a sealant layer; and
   a degassing part configured to have a degassing aperture punched when a degassing process is performed, wherein the degassing part does not have the gas barrier layer.

8. The pouch of claim 7, wherein the metal comprises aluminum.

9. The pouch of claim 7, wherein the surface protection layer is made of a polymer, and
   wherein the polymer comprises at least one of nylon and PET.

10. The pouch of claim 9, wherein the polymer comprises nylon.

11. The pouch of claim 7, wherein the sealant layer is made of a polymer, and
    wherein the polymer comprises at least one of polypropylene and polyethylene.

12. The pouch of claim 11, wherein the polymer comprises polypropylene.

13. The pouch of claim 7, wherein the degassing part is configured to be cut and removed after the degassing process is performed.

14. The pouch of claim 7, wherein the degassing part is configured to be wound around a side portion of the cup part after the degassing process is performed.

15. The pouch of claim 14, further comprising a protection circuit module, wherein the protection circuit module is electrically connected to an electrode tab of the electrode assembly, comprises an input/output terminal that performs charging/discharging of the electrode assembly, and controls malfunction.

16. The pouch of claim 15, further comprising:
    an upper molding part that covers an upper portion of the protection circuit module and exposes the input/output terminal; and
    a lower molding part that protects a lower portion of the protection circuit module against an external impact.

17. A method for manufacturing a pouch for a secondary battery, the method comprising steps of:
    forming a first adhesion surface by applying an adhesive to a portion of both surfaces of a metal plate while the metal plate is transferred;
    cutting the metal plate;
    forming a plurality of first lamination plates by respectively laminating a plurality of surface protection plates on the both surfaces of the metal plate;
    forming a second adhesion surface by applying the adhesive on an entire surface of at least one of the plurality of first lamination plates, on which the metal plate is laminated;
    forming a second lamination plate by laminating a sealant plate on the second adhesion surface; and
    cutting the second lamination plate to form a piece comprising a cup part in which the metal plate exists and a degassing part in which no metal plate exists.

18. The method of claim 17, wherein, in the step of cutting the metal plate, the metal plate is cut with respect to a boundary of the first adhesion surface.

19. The method of claim 18, wherein, in the step of forming the first adhesion surface on a portion of the metal plate, the first adhesion surface is repeatedly and alternately formed on the both surfaces of the metal plate at a predetermined distance.

20. The method of claim 18, wherein, in the step of forming the first adhesion surface on a portion of the metal plate, the first adhesion surface is formed on only one surface of the metal plate at a left side and only the other surface of the metal plate at a right side with respect to a central axis formed along a longitudinal direction of the metal plate.

* * * * *